L. N. WARREN.
Grain Drill.
No. 55,184.
2 Sheets—Sheet 1.
Patented May 29, 1866.
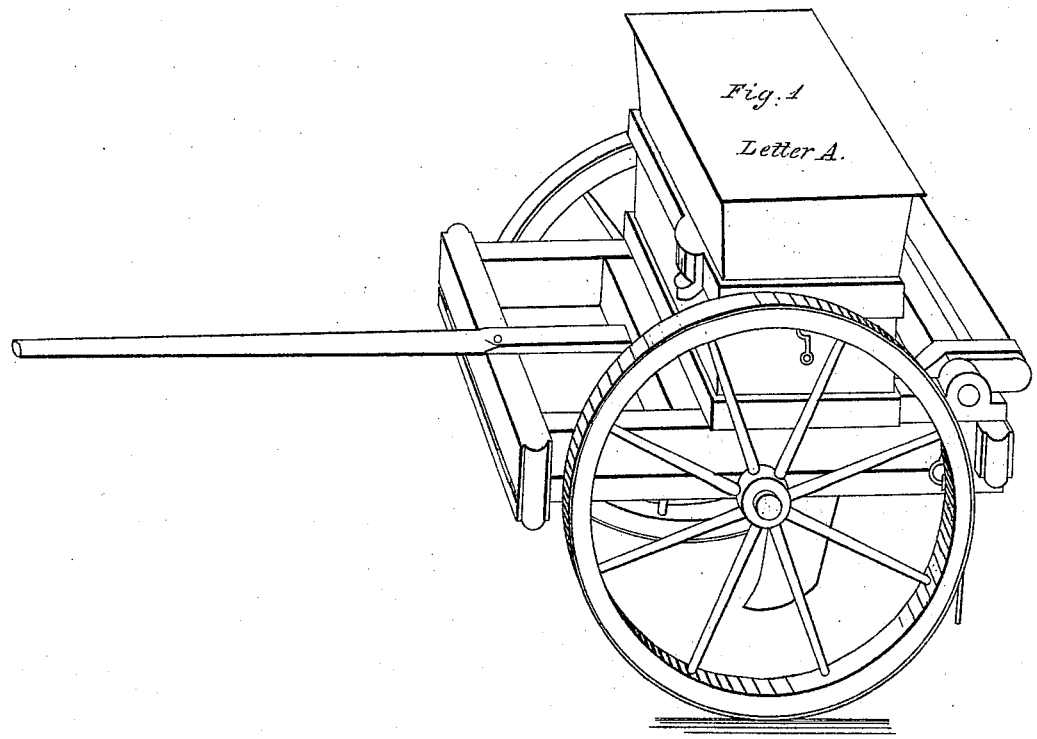
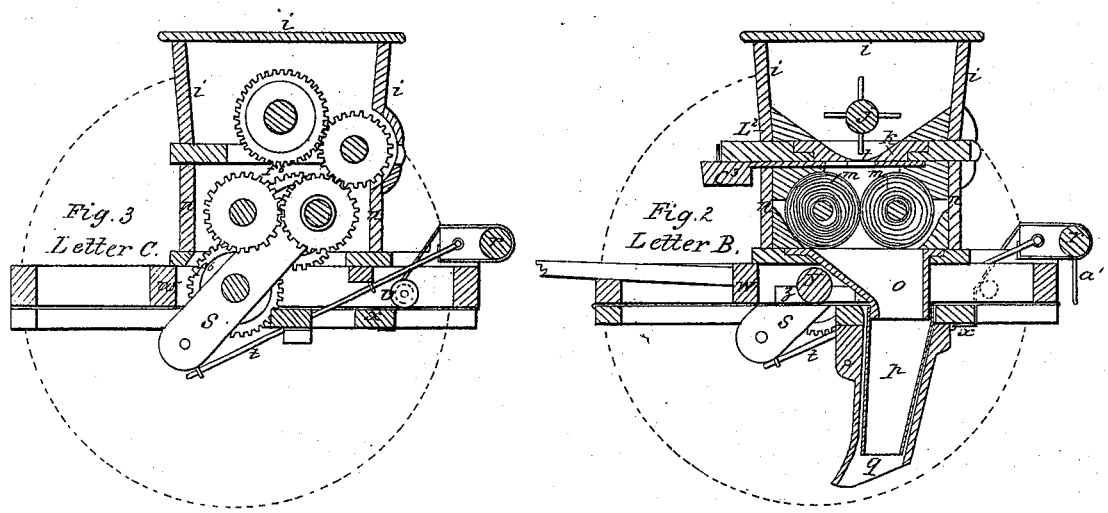
Witnesses:
G. W. Mygatt
Cha. H. Hay
Inventor:
Levi N. Warren L. N. WARREN.
Grain Drill.
No. 55,184.
2 Sheets—Sheet 2.
Patented May 29, 1866.
Fig. 5. Letter E.
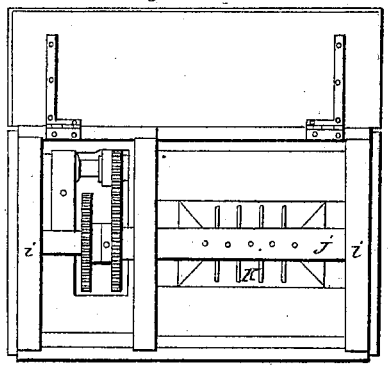
Fig. 6. Letter F.
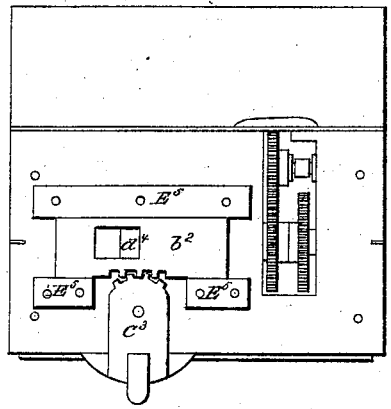
Fig. 7. Letter G.
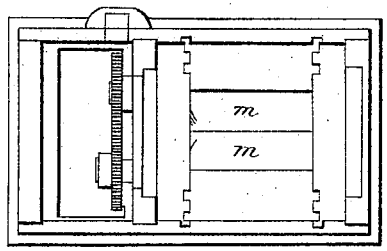
Fig. 8. Letter H.
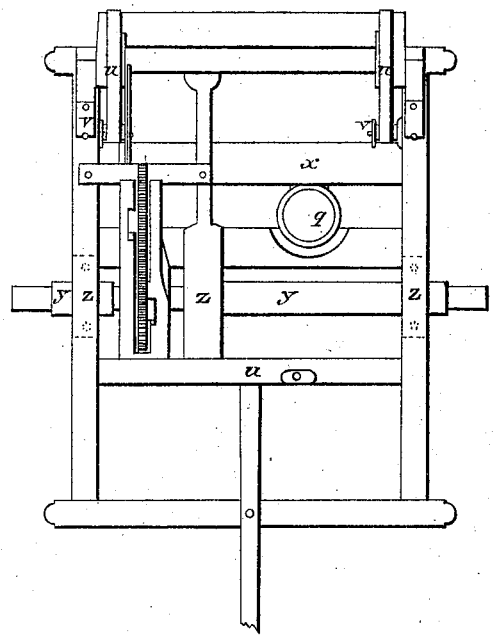
Fig. 4. Letter D.
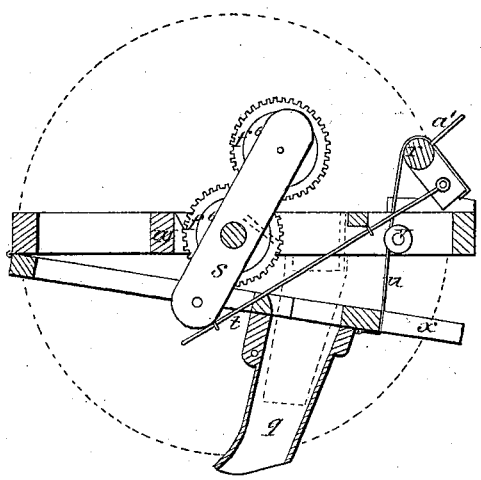
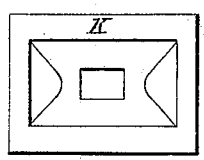
Witnesses:
G. W. Mygatt
Cha. H. Haig
Inventor:
Levi N. Warren

UNITED STATES PATENT OFFICE.

LEVI N. WARREN, OF MILWAUKEE, WISCONSIN.

IMPROVEMENT IN GRAIN-DRILLS.

Specification forming part of Letters Patent No. 55,184, dated May 29, 1866.

*To all whom it may concern:*

Be it known that I, LEVI N. WARREN, of the city and county of Milwaukee, and State of Wisconsin, have invented a new and useful Improvement on a Grain-Drill; and I do hereby declare that the following is a full, clear, and exact description of the construction and operation of the same, reference being had to the annexed drawings, making a part of this specification, in which—

Figure 1, Letter A, is a perspective view.

Fig. 2, Letter B, is a transverse section through the grain-box.

Fig. 3, Letter C, is a transverse section through the grain-box, showing the spur-gearing.

Fig. 4, Letter D, is a section of the frame or bottom of drill, the falling bar, the lever-bar, the detachment-lever, the detachment-rod, the detachment cog-wheels, the lever-bar, the straps connecting the lever-bar and the falling bar, the pulley over which the straps pass, the sub-tube in dotted lines, and the ground-tube.

Fig. 5, Letter E, interior of grain-box, showing the agitator, the position of the spur-gearing, the inclined-plane aperture-plate, and the regulator or gage which controls the quantity of seed to be distributed.

Fig. 6, Letter F, the under side of the bottom of the grain-box, showing the sliding plate and its aperture, and the movable gage controlling the sliding plate and the size of aperture and position of the gearing.

Fig. 7, Letter G, is the inside view of the cylinder-box, showing the double cylinders and the space for the gearing.

Fig. 8, Letter H, is the bottom frame-work, and showing the axles in two lengths, the falling bar, the straps connecting with the lever-bar, the lever-bar, the rollers over which the straps pass, and the position of the ground-tube. Letter $i$ is the grain-box; $j$, the agitator; $k$, the inclined-plane aperture-plate; $l$, aperture for grain to the double cylinders; $m\ m$, double cylinders; $n\ n$, cylinder-box; $o$, tube from cylinder-box directing grain to sub-tube; $p$, sub-tube; $q$, ground-tube, directing grain from sub-tube into the ground. This ground-tube is attached to the falling bar, and depressible by action of the lever-bar, as desired; $r$, lever-bar; $s$, detachment-lever; $t$, detachment-rod connecting and acting with lever-bar and the falling bar; $u$, straps attached to falling bar and lever-bar; $v$, pulley over which the straps pass; $w$, bottom frame; $x$, the falling bar; $y$, the axles in two parts fixed in the hubs of the wheels and revolving on journals at the inner ends; $z$, the boxes for axles and journals on inner ends of axles, allowing for reverse revolutions of the axles and wheels in turning about the grain-drill. Letter $a$ No. 1, handle to lever-bar; $b$ 2, sliding plate on the under side of the cylinder-box; $c$ 3, regulating-gage controlling sliding plate and sliding-plate aperture; $d$ 4, aperture in sliding plate; $e$ 5, the cleats forming groove for the sliding plate; $f$ 6, detachment cog-wheels, in detachment lever controlled by the action of lever-bar, are thrown in and out of gear with other wheels.

The operation of the inclined-plane aperture-plate is to facilitate the delivery of the grain.

The operation of the falling bar is to operate a series of ground-tubes permanently attached to the falling bar and raised and lowered by one operation.

The operation of the lever-bar with the straps of leather or equivalent attached to the lever-bar and the falling bar performs the operation of raising or lowering the ground-tubes and falling bar, as desired.

The axles bisected between the wheels, with their journals on the inner ends, allow for contrary or reacting revolutions in turning about the drill, the inner ends of axles revolving in box $z$.

What I claim, and desire to secure by Letters Patent, is—

1. The inclined metallic aperture-plate $k$, or its equivalent, the metallic sub-tube $p$, with flexible joint, the attachment of the ground-tubes $q$ to the falling bar $x$, all in combination.

2. The combination of the detachment rod and lever in elevating the ground-tubes and detaching the gearing-wheels at one operation, substantially as described and shown, and for the purpose set forth.

LEVI N. WARREN.

Witnesses:
G. W. MYGATT,
CHAS. H. HURD.